US012573082B2

(12) United States Patent
Maggio et al.

(10) Patent No.: US 12,573,082 B2
(45) Date of Patent: Mar. 10, 2026

(54) ANCHOR SEGMENT DETECTION FOR CONTENT ENHANCEMENT

(71) Applicant: Disney Enterprises, Inc., Burbank, CA (US)

(72) Inventors: Nicholas Maggio, Pittsford, NY (US); Evan M. Goldberg, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 113 days.

(21) Appl. No.: 18/428,624

(22) Filed: Jan. 31, 2024

(65) Prior Publication Data

US 2024/0289982 A1 Aug. 29, 2024

Related U.S. Application Data

(60) Provisional application No. 63/448,393, filed on Feb. 27, 2023.

(51) Int. Cl.
| | |
|---|---|
| *G06T 7/73* | (2017.01) |
| *G06T 7/269* | (2017.01) |
| *G06T 7/40* | (2017.01) |
| *G06T 11/00* | (2026.01) |

(52) U.S. Cl.
CPC .............. *G06T 7/73* (2017.01); *G06T 7/269* (2017.01); *G06T 7/40* (2013.01); *G06T 11/00* (2013.01); *G06T 2207/10016* (2013.01); *G06T 2207/20224* (2013.01)

(58) Field of Classification Search
CPC ........... G06T 11/00; G06T 2207/10016; G06T 2207/20224; G06T 7/246; G06T 7/269; G06T 7/40; G06T 7/73
See application file for complete search history.

(56) References Cited

U.S. PATENT DOCUMENTS

| | | | |
|---|---|---|---|
| 2009/0087096 A1* | 4/2009 | Eaton ..................... | G06V 10/28 |
| | | | 382/190 |
| 2009/0285544 A1* | 11/2009 | Fitzgibbon .............. | G06T 7/246 |
| | | | 386/239 |
| 2019/0130583 A1* | 5/2019 | Chen ...................... | G06T 7/194 |

(Continued)

OTHER PUBLICATIONS

International Search Report and Written Opinion dated Jun. 7, 2024 for International Application PCT/US2024/016188.

(Continued)

*Primary Examiner* — Xiao M Wu
(74) *Attorney, Agent, or Firm* — Farjami & Farjami LLP

(57) ABSTRACT

A system includes a hardware processor and a system memory storing software code. The hardware processor is configured to execute the software code to receive reference content including a plurality of images in sequence, analyze the plurality of images to identify pixel feature changes between sequential images of the plurality of images, and identify, based on the pixel feature changes, one or more static image segments within the plurality of images. The hardware processor is further configured to execute the software code to evaluate the one or more static image segments using at least one of a size criterion or a visual feature criterion, select, based on evaluating, one of the one or more static image segments as an anchor segment, and provide mapping data identifying a location of the anchor segment within each of the plurality of images.

20 Claims, 4 Drawing Sheets

(56)            References Cited

U.S. PATENT DOCUMENTS

2019/0130586 A1*    5/2019    Zhou ........................ G06T 7/254
2021/0365707 A1*    11/2021    Mao ........................ G06V 20/46

OTHER PUBLICATIONS

Cheng Huang and Hongmei Wang "A Novel Key-Frames Selection Framework for Comprehensive Video Summarization" IEEE Transaction on Circuits and Systems for Video Technology, vol. 30, No. 2, Feb. 2020 13 Pgs.
Joao Luis Antunes "AR with Cloud Anchors: A Way to Improve HCI and Interactive Art" International Journal of Creative Interfaces and Computer Graphics, vol. 10, No. 2, Jul. 31, 2019 13 Pgs.
International Preliminary Report on Patentability dated Aug. 28, 2025 for International Application PCT/US2024/016188.
U.S. Appl. No. 17/887,731, filed Aug. 15, 2022, Goldberg.
U.S. Appl. No. 17/887,742, filed Aug. 15, 2022, Goldberg.
U.S. Appl. No. 17/887,754, filed Aug. 15, 2022, Goldberg.

* cited by examiner

Figure 1:
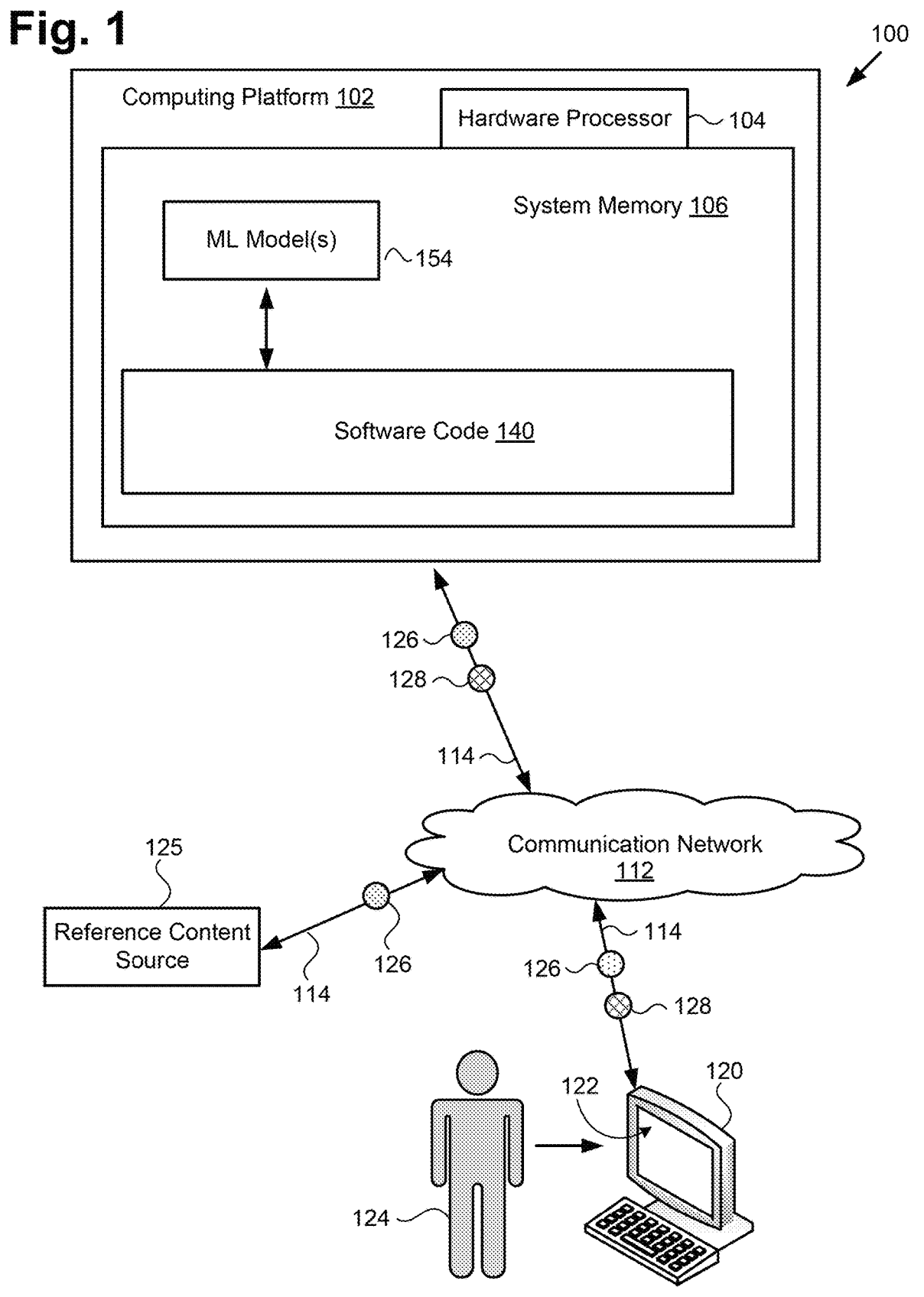

Computing Platform 102

Hardware Processor ～ 104

System Memory 106

ML Model(s) ～154

Software Code 140

126 ～

128 ～

114 ～

Communication Network 112

125

Reference Content Source

Figure 4:
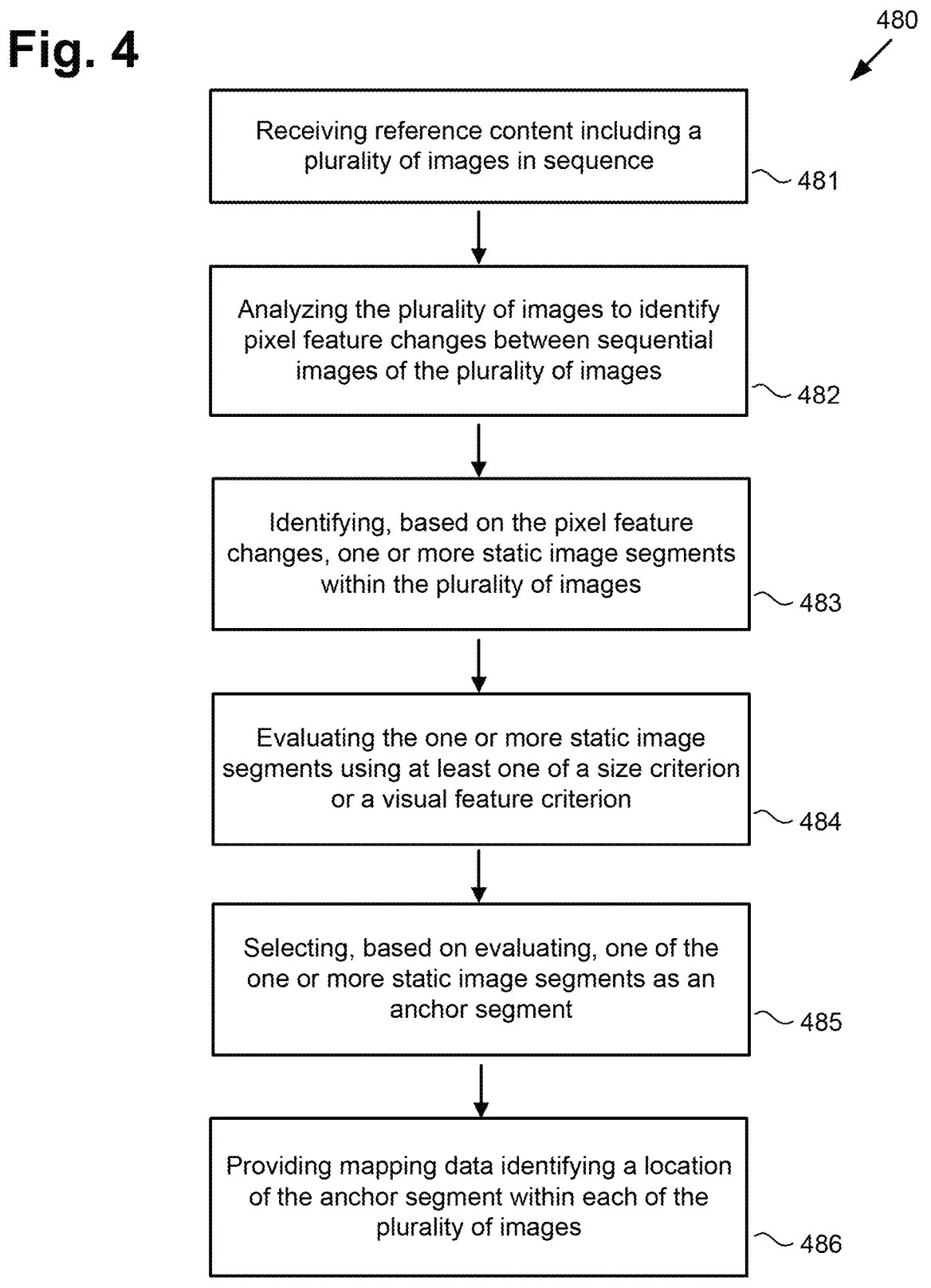

Receiving reference content including a plurality of images in sequence

~481

↓

Analyzing the plurality of images to identify pixel feature changes between sequential images of the plurality of images

~482

↓

Identifying, based on the pixel feature changes, one or more static image segments within the plurality of images

~483

↓

Evaluating the one or more static image segments using at least one of a size criterion or a visual feature criterion

~484

↓

Selecting, based on evaluating, one of the one or more static image segments as an anchor segment

~485

↓

Providing mapping data identifying a location of the anchor segment within each of the plurality of images

~486

ANCHOR SEGMENT DETECTION FOR CONTENT ENHANCEMENT

RELATED APPLICATIONS

The present application claims the benefit of and priority to a U.S. Provisional Patent Application Ser. No. 63/448,393 filed on Feb. 27, 2023, and titled "Static Video Segment Detection for Augmented Reality Alignment," which is hereby incorporated fully by reference into the present application.

BACKGROUND

Augmented reality (AR) applications seek to enhance content by overlaying virtual features on the content as it is rendered on a display screen. When implemented as intended, AR effects can advantageously provide users with a more immersive and enjoyable content consumption experience.

Despite their potential for increasing user enjoyment of content, challenges remain in identifying desirable image anchors for AR effects. Additionally, further complications can arise when accessibility feature overlays such as subtitles or captioning occlude elements of the image necessary for AR tracking (i.e., an image anchor). For example, locating such an image anchor for an AR effect in a portion of a video frame undergoing dynamic changes between video frames during an action sequence can significantly impair the ability of an AR application to detect and track the media content. Consequently, there is a need in the art for an automated solution enabling identification of static portions of images that can be used as image anchors for AR effects.

BRIEF DESCRIPTION OF THE DRAWINGS

FIG. 1 shows a diagram of an exemplary system for detecting static image segments in a sequence of images, suitable for use as anchor segments, according to one implementation;

FIG. 4 shows a flowchart outlining an exemplary method for use by a system to detect static image segments in a sequence of images, suitable for use as anchor segments, according to one implementation.

DETAILED DESCRIPTION

Figure 2:
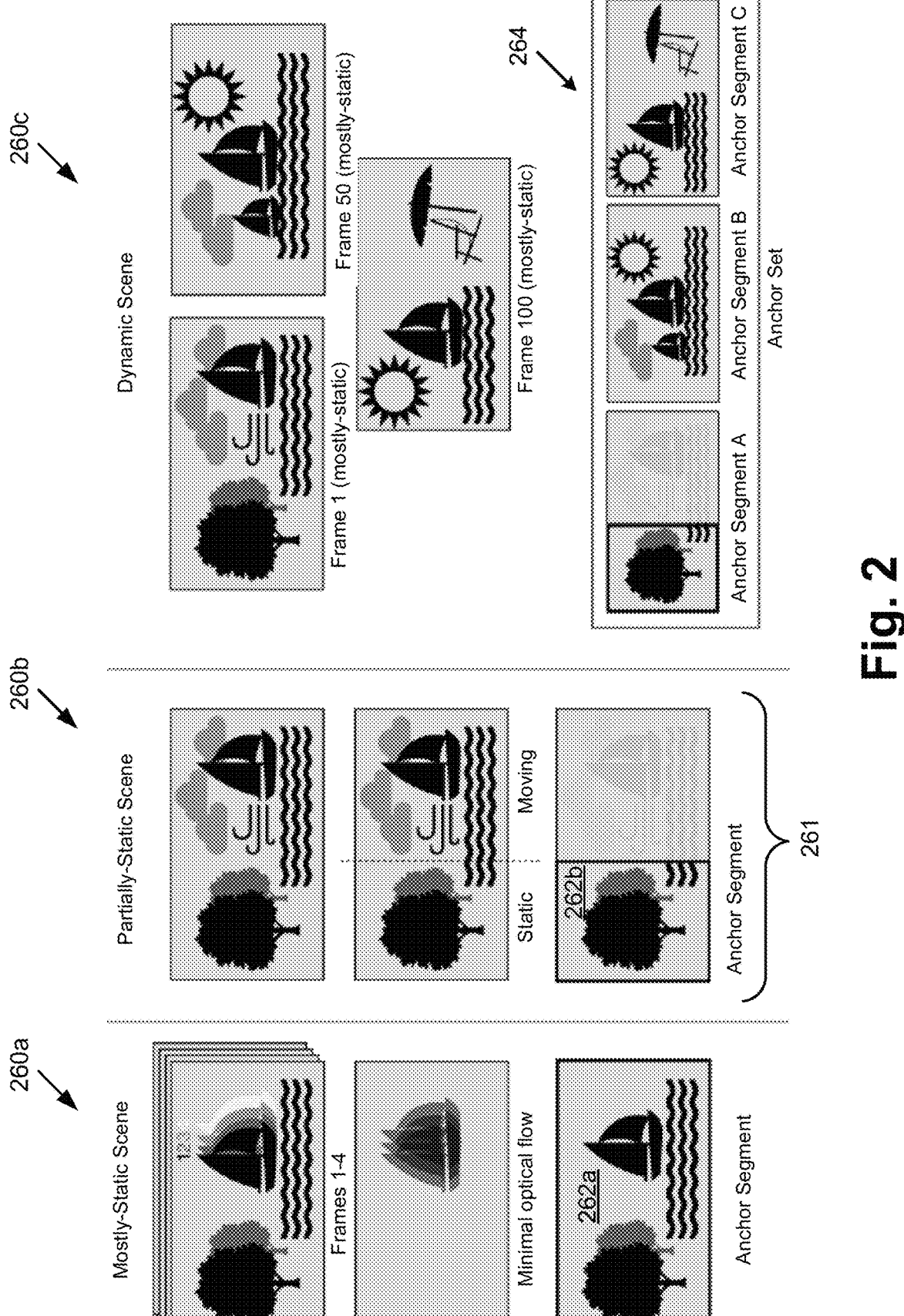
FIG. 2 shows diagrams depicting three exemplary use cases in which one or more anchor segments for use in content enhancement are selected, according to various implementations.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, augmented reality (AR) applications seek to enhance content by overlaying virtual features on the content as it is rendered on a display screen. When implemented as intended, i.e., when not occluded by visual obstructions such as content elements or light glare on a display screen, AR effects can advantageously provide users with a more immersive and enjoyable content consumption experience.

However, and as also noted above, despite their potential for increasing user enjoyment of content, challenges remain in identifying desirable image anchors for AR effects or accommodating for visual content obstructions such as accessibility feature overlays, lighting glare on the display screen, and the like. For example, locating such an image anchor for an AR effect in a portion of a video frame undergoing dynamic changes between video frames during an action sequence can significantly impair the ability of an AR application to detect and track the media content.

The present application discloses systems and methods for detecting static image segments in a sequence of images, such as a video sequence for example, suitable for use as anchor segments, that address and overcome the deficiencies in the conventional art. It is noted that, as defined in the present application, the feature "anchor segment" refers to an image or a subsection (hereinafter "portion") of an image that is static from image-to-image, and that additionally meets one or more criteria in terms of size, visual contrast, visual texture, or any combination thereof. An anchor segment is a video frame or portion of a video frame that is suitable for use as a two-dimensional (2D) template upon which one or more AR effects may be overlaid, or from which one or more AR effects may extend into an environment in which a display screen displaying the anchor segment is located. In various use cases, an anchor segment may be a single video frame in its entirety, a portion of a video frame that is less than the entire video frame, or to a sequence of multiple video frames. Moreover, in some implementations, more than one anchor segment may overlap or partially overlap in the same video frame.

It is further noted that the anchor segment detection solution disclosed in the present application may advantageously be implemented as automated systems and methods. As a result, the present anchor segment detection solution can be applied automatically on a large dataset, allowing the processing of an extensive back catalogue of video content that would be impracticable to perform manually.

As used in the present application, the terms "automation," "automated" and "automating" refer to systems and processes that do not require the participation of a human user such as a system administrator. Although in some implementations the anchor segments detected by the systems and methods disclosed herein may be reviewed or even modified by a human editor or system administrator, that human involvement is optional. Thus, the methods described in the present application may be performed under the control of hardware processing components of the disclosed systems. It is also noted that although the present anchor segment detection solution is described herein with reference to a specific use case in which AR effects are to be superimposed on video frames, that implementation is merely exemplary.

FIG. 1 shows exemplary system 100 for detecting static image segments (suitable for use as anchor segments) in a sequence of images, according to one implementation. As shown in FIG. 1, system 100 includes computing platform 102 having hardware processor 104, and system memory 106 implemented as a computer-readable non-transitory storage medium. According to the present exemplary implementation, system memory 106 stores software code 140, and in some implementations may further store one or more machine learning (ML) models 154 (hereinafter "ML model(s) 154") including an ML model specifically trained to predict static image segments.

It is noted that, as defined for the purposes of the present application, the expression "ML model" refers to a mathematical model for making future predictions based on statistics, or on patterns learned from samples of data or "training data." Various learning algorithms can be used to map correlations between input data and output data. These correlations form the mathematical model that can be used to make future predictions on new input data. Such a ML model may include one or more logistic regression models. Bayesian models, or artificial neural networks (NNs). Moreover, a "deep neural network," in the context of deep learning, refers to a NN that utilizes multiple hidden layers between input and output layers, which may allow for learning based on features not explicitly defined in raw data. In various implementations, ML models may be trained as classifiers.

As further shown in FIG. 1, system 100 may be implemented in a use environment including communication network 112, user 124 utilizing client system 120 including display 122, a source 125 of reference content (hereinafter "reference content source 125"), and reference content 126 received by system 100 from one or both of client system 120 and reference content source 125. In addition, FIG. 1 shows network communication links 114 communicatively coupling client system 120 and reference content source 125 with system 100 via communication network 112. Also shown in FIG. 1 is mapping data 128. It is noted that reference content 126 includes a plurality of images in sequence, such as a sequence of video frames for example, while mapping data 128 identifies the respective locations of one or more anchor segments within each of the plurality of images of reference content 126.

Although the present application refers to software code 140 and ML model(s) 154 as being stored in system memory 106 for conceptual clarity, more generally, system memory 106 may take the form of any computer-readable non-transitory storage medium. The expression "computer-readable non-transitory storage medium." as defined in the present application, refers to any medium, excluding a carrier wave or other transitory signal, that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 140 and ML model(s) 154 as being mutually co-located in system memory 106 that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, hardware processor 104 and system memory 106 may correspond to distributed processor and memory resources within system 100. Thus, it is to be understood that software code 140 and ML model(s) 154 may be stored remotely from one another within the distributed memory resources of system 100. It is also noted that, in some implementations, ML model(s) 154 may take the form of one or more software modules included in software code 140.

Hardware processor 104 may include multiple hardware processing units, such as one or more central processing units, one or more graphics processing units, and one or more tensor processing units, one or more field-programmable gate arrays (FPGAs), custom hardware for machine-learning training and/or an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 140, from system memory 106, while a GPU may be implemented to reduce the processing overhead of the CPU by performing computationally intensive graphics or other processing tasks. A TPU is an application-specific integrated circuit (ASIC) configured specifically for AI applications such as ML modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, communication network 112 may be a high-speed network suitable for high performance computing (HPC), for example a 10 GigE network or an Infiniband network.

Although client system 120 is shown as a desktop computer in FIG. 1, that representation is provided merely as an example as well. More generally, client system 120 may be any suitable mobile or stationary computing device or system that implements data processing capabilities sufficient to provide a user interface, support connections to communication network 112, and implement the functionality ascribed to client system 120 herein. For example, in other implementations, client system 120 and may take the form of a laptop computer, tablet computer, or smartphone. In still other implementations, client system 120 may be a peripheral device of system 100 in the form of a dumb terminal. In those implementations, client system 120 may be controlled by hardware processor 104 of computing platform 102.

In various use cases, reference content 126 may be or include recorded content, such as a recorded movie or television (TV) program, for example, or may be or include streaming content, such as a streamed movie or TV program. Moreover, in some use cases, reference content 126 may be or include a live feed, such as a video feed or content stream of a live performance, breaking news event, or live sports event, for example. Accordingly, reference content source 125 may be a database of recorded content, a TV broadcast source, a content streaming service, or the source of a live video feed.

With respect to display 122 of client system 120, display 122 may be physically integrated with client system 120, or may be communicatively coupled to but physically separate from client system 120. For example, where client system 120 is implemented as a smartphone, laptop computer, or tablet computer, display 122 will typically be integrated with client system 120. By contrast, where client system 120 is implemented as a desktop computer, display 122 may take the form of a monitor separate from client system 120 in the form of a computer tower. Furthermore, display 122 of client system 120 may be implemented as a liquid crystal display (LCD), a light-emitting diode (LED) display, an organic light-emitting diode (OLED) display, a quantum dot (QD) display, or any other suitable display screen that performs a physical transformation of signals to light.

According to some exemplary implementations, system 100 may be configured to enable the accurate alignment of AR effects with a sequence of images by identifying static parts of the images that can be used as reference points for placement of AR effects. In some such implementations optical flow, in which motion within an image and its change from image-to-image are measured and evaluated, may be used to detect image segments that remain static long enough for standard AR devices using image detection to spatially calibrate and align a virtual world for placing augmented computer-generated objects overlaid on the display screen. This can be achieved by analyzing changes to pixels in the sequence of images over time to identify static regions that can be used as anchor segments for placement of AR effects.

Alternatively, in some implementations frame subtraction, in which an image is subtracted from the next image in sequence may be used to identify static imagery suitable for use as anchor segments. The advantage of both the optical flow and the frame subtraction approaches is that both allow the present anchor segment detection solution to be run automatically on a large dataset, allowing the processing of an extensive back catalogue of video content that would be impracticably costly to perform manually. That is to say, the present anchor segment detection solution advantageously enables the automated identification of static reference points within a sequence of images, without the need for visible markers or manual selection. The present anchor segment detection solution also has the potential to be more flexible and adaptable to different types of content, as it can analyze changes of pixels over time to identify static image regions.

It is noted that, in order to serve as an anchor segment, a static segment of an image should meet a size criterion, i.e., not be too small to accommodate AR effect tracking, and should also include sufficient contrast and detail, such as visual texture, to allow computer vision alignment algorithms to function. The particular criterion applied with respect to a size requirement for an anchor segment, as well as the degree of motion allowable from frame-to-frame may vary depending on a variety factors, including the platform generating the AR effects, the anticipated distance from which the images are to be viewed, the display screen size on which the images are to be rendered, the presence of visual occlusion elements such as accessibility features in the form of subtitles or captioning, and possible environmental factors such as ambient lighting or screen glare, to name a few.

It is further noted that, in some implementations, detection of anchor segments may be based on a simple threshold criterion in which a segment either meets or does not meet specific size requirements or motion thresholds. However, in some implementations, such as when optical flow is used to detect anchor segments for example, a motion gradient may be computed and anchor segments may be detected based on such a gradient.

FIG. 2 shows respective diagrams 260a, 260b and 260c depicting three exemplary use cases in which one or more anchor segments for use in content enhancement are selected, according to various implementations. As shown by diagram 260a, where a scene including multiple images in the form of video frames includes only video frames that are mostly static, i.e., remain substantially the same from video frame to video frame, any of the video frames within that scene may serve as anchor segment 262a. That is to say, anchor segment 262a is the entire video frame that includes the mostly static boat, water, and tree. It is noted that, as used in the present application, the term "scene," as applied to video content, is a shot or series of shots that together deliver a single, complete and unified dramatic element of film narration, or block of storytelling within a film. Moreover, as used in the present application, the term "shot" refers to a sequence of frames of video that are captured from a unique camera perspective without cuts or other cinematic transitions.

As further shown by diagram 260b, where a scene including multiple video frames includes video frames that are partially-static, i.e., some elements change substantially from video frame to video frame but include some imagery that is mostly static from video frame to video frame, the static imagery portion of any of the video frames within the scene may serve as anchor segment 262b. That is to say, in the example of FIG. 2, anchor segment 262b includes only the tree portion (i.e., the static imagery portion) of video frame 261. With respect to the expression "imagery that changes substantially from video frame to video frame," that expression refers to change of the composition as a whole of the imagery from frame-to-frame. In diagram 260c, for example, the depicted boat changes location from frame right (i.e., frame 1), to frame center (i.e., frame 50), to frame left (i.e., frame 100), while other features, such as a tree, umbrella, and chair move and appear or disappear at different timestamps.

As further shown by diagram 260c, where a scene including multiple video frames includes video frames that are dynamic, i.e., video frames including imagery that changes substantially from video frame to video frame, a subset of multiple video frames, portions of video frames, or both, may serve as anchor set of images 264. For example, the dynamic scene represented by diagram 260c includes mostly dynamic images, e.g., frames 2-49 and 51-99, and only frames 1, 50 and 100 that are static or mostly-static. Thus, in this particular use case anchor set of images 264, each suitable for use as an anchor segment for the mostly dynamic scene, includes a portion of partially static frame 1, and each of mostly static frames 50 and 100 in their entireties. It is noted that although the image of the boat appears in all of frames 1, 50, and 100, while other imagery appears and disappears, it is typically advantageous to use as large a portion of a video frame as possible as an anchor segment, which is why the entirety of mostly-static frames 50 and 100 are included as anchor segments of anchor set 264, rather than only the portion of frames 50 and 100 depicting the boat.

Figure 3:
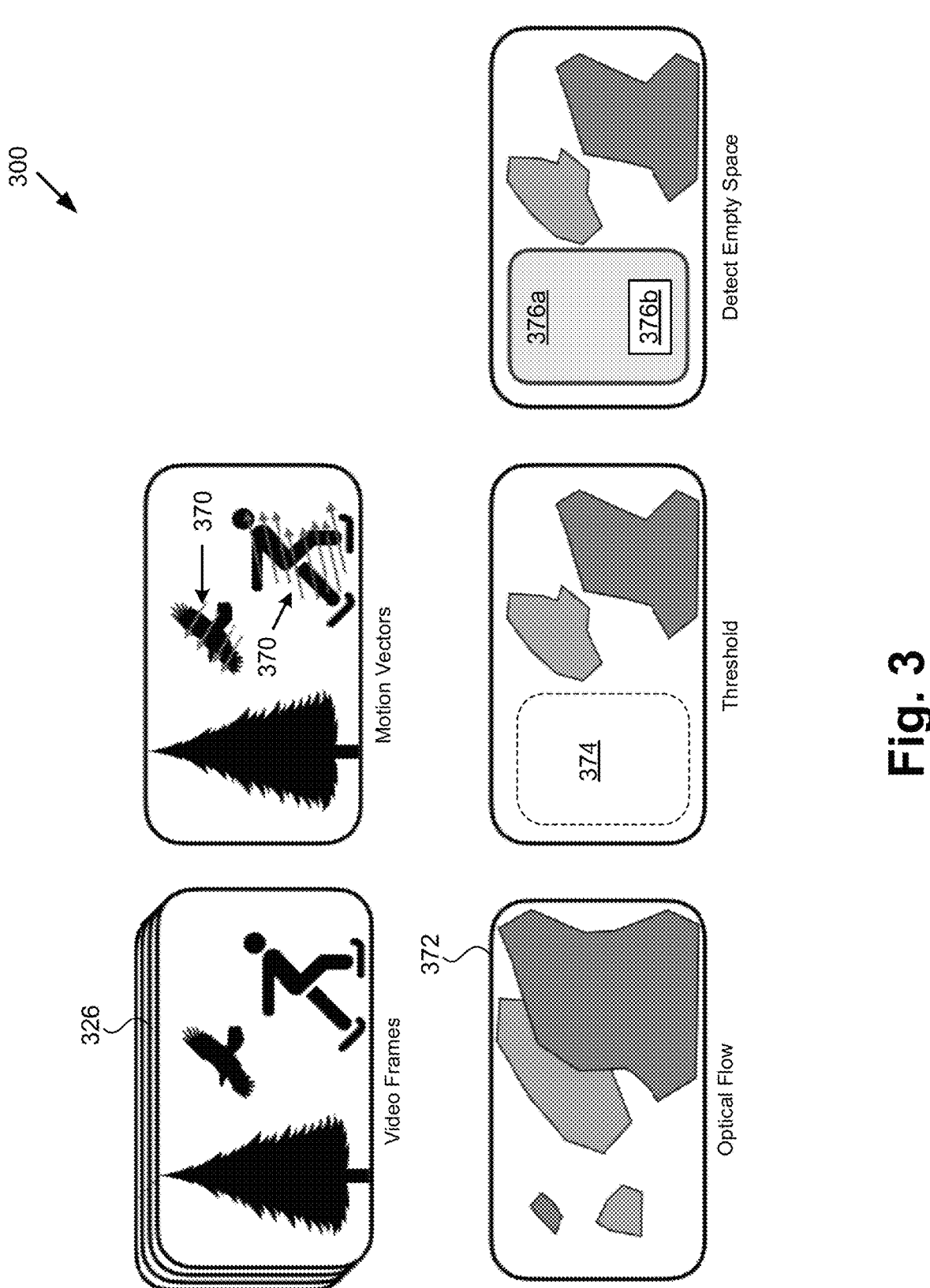
FIG. 3 shows a diagram depicting an exemplary use case in which one or more anchor segments for use in content enhancement are selected based on optical flow, according to one implementation.

FIG. 3 shows diagram 300 depicting an exemplary use case in which one or more anchor segments for use in content enhancement are selected based on optical flow, according to one implementation. FIG. 3 includes reference content 326 including a plurality images in sequence in the form of video frames that include depictions of a skater, a bird in flight, and a tree. Motion vectors 370 indicate that the skater and bird in flight are dynamic portions of the video frames that change substantially from frame-to-frame. By contrast, the image of the tree is a relatively static portion of the video frames, as shown by optical flow 372 of the change in motion of different portions of the video frames including the skater, the bird in flight, and the tree. It is noted that optical flow is detected on all pixels to determine changes in those pixels from frame-to-frame, thereby providing motion vectors 370 representing motion within a scene. Thus, optical flow does not detect the motion of an object, such as the skater or the bird in reference content 326, per se, but rather changes in the pixels that collectively depict the skater and the bird.

According to the exemplary implementation shown in FIG. 3, the measure of motion of the tree image of the video frame satisfies, i.e., is less than or equal to, a motion restriction threshold and is determined to occupy static image segment 374 of the video frames. Also shown is overlay of static image segments including larger static image segment 376a and smaller static image segment 376b within larger static image segment 376a and partially overlapping larger static image segment 376a. It is noted that one benefit of having overlying smaller and larger static image segments is that if larger static image segment 376a is partially occluded but that occlusion does not affect smaller static image segment 376b, smaller static image segment 376b may be used as an anchor segment.

It is further noted that reference content 326 corresponds in general to reference content 126, in FIG. 1. Consequently, reference content 326 may share any of the characteristics attributed to reference content 126 by the present disclosure, and vice versa. It is also noted that in order to be suitable for use as anchor segments, static image segment 374, larger static image segment 376a and smaller static image segment 376b should meet one or more criteria in terms of size, visual texture, visual contrast, or any combination of those features, as will described in greater detail below by reference to FIG. 4.

Moreover, having a hierarchy of anchor segments advantageously provides considerable flexibility in the detection or tracking of AR effects or obstructions from accessibility features depending on the circumstances under which the video sequence of reference content 126/326 is rendered, including environmental factors such as screen glare, the need to use smaller anchor segments for captioning or subtitles, or any combination thereof. By way of example, where reference content 126/326 is rendered on a distant screen, it may be advantageous or desirable to use a larger anchor segment corresponding to larger static image segment 376a for the placement of AR effects, while when rendered on a small closely held personal device, it may be preferable to use a smaller anchor segment corresponding to smaller static image segment 376b rather than a larger anchor segment corresponding to larger static image segment 376a for the placement of AR effects.

The use of anchor segments to enable the enhancement of content using AR effects is disclosed in greater detail in U.S. patent application Ser. No. 17/887,731, filed on Aug. 15, 2022, and titled "Augmented Reality Enhancement of Moving Images," and U.S. patent application Ser. No. 17/887, 754, filed on Aug. 15, 2022, and titled "Dynamic Scale Augmented Reality Enhancement of Images," which are hereby incorporated fully by reference into the present application.

The functionality of system 100, shown in FIG. 1, will be further described by reference to FIG. 4. FIG. 4 shows flowchart 480 outlining an exemplary method for use by a system to detect static image segments in a sequence of images, suitable for use as anchor segments, according to one implementation. With respect to the method outlined in FIG. 4, it is noted that certain details and features have been left out of flowchart 480 in order not to obscure the discussion of the inventive features in the present application.

Referring to FIG. 4 in combination with FIGS. 1 and 3, flowchart 480 includes receiving reference content 126/326 including a plurality of images in sequence (action 481). As noted above, in some implementations, reference content 126/326 may take the form of a video sequence. As further noted above, in various use cases, reference content 126/326 may be or include recorded content, such as a recorded movie or TV program, for example, or may be or include streaming content, such as a streamed movie or TV program. Moreover, in some use cases, reference content 126/326 may be or include a live feed, such as a video feed or content stream of a live performance, breaking news event, or live sports event, for example.

Reference content 126/326 may be received, in action 481, by software code 140, executed by hardware processor 104 of system 100. As shown in FIG. 1, in some use cases, reference content 126/326 may be received by system 100 from client system 120, via communication network 112 and network communication links 114. Alternatively, and as also shown in FIG. 1, in other use cases reference content 126/326 may be received by system 100 from reference content source 125, via communication network 112 and network communication links 114.

Continuing to refer to FIG. 4 in combination with FIGS. 1 and 3, flowchart 480 further includes analyzing the plurality of images included in reference content 126/326 to identify pixel feature changes between sequential images of the plurality of images (action 482). In some implementations, as noted above, the pixel feature changes between sequential images of the plurality of images may be analyzed in action 482 based on optical flow. That is to say, motion within an image and the change in motion from image-to-image may be measured and evaluated. This can be achieved by analyzing changes to pixels in the sequence of images over time to identify static image segments that may be suitable for use as anchor segments for AR effects.

Alternatively, in some implementations the pixel feature changes between sequential images of the plurality of images may be analyzed based on image subtraction between the sequential images. Thus, one of the plurality of images may be subtracted from the next or previous image in the sequence to identify static image segments that may be suitable for use as anchor segments for placement of AR effects. The analysis of the pixel feature changes occurring in action 482 may be performed by software code 140, executed by hardware processor 104 of system 100.

Continuing to refer to FIG. 4 in combination with FIGS. 1 and 3, flowchart 480 further includes identifying, based on the pixel feature changes analyzed in action 482, one or more static image segments within the plurality of images, such as static image segment 374, larger static image segment 376a, and/or smaller static image segment 376b, for example. (action 483). As noted above, the identification of the one or more static image segments, in action 483, may be performed as a result of the analysis performed in action 482 based on optical flow or image subtraction.

In implementations in which the analysis performed in action 482 is based on optical flow, action 483 may include determining what segments within the plurality of images included in reference content 126/326 satisfies, i.e., is less than or equal to, a motion restriction threshold, which may differ from use case to use case depending on various factors including the end platform or AR application to be used and/or the error tolerance of such a platform or application. In implementations in which the analysis performed in action 482 is based on image subtraction, action 483 may include determining what segments within the plurality of images included in reference content 126/326 satisfies a pixel cancellation threshold, which threshold, as well as the manner of performing image subtraction, may also differ from use case to use case depending on various factors including the end platform or AR application to be used and/or the error tolerance of such a platform or application. It is noted that, because static image segments in consecutive images remain similar or the same, in image subtraction the pixels in those static image segments can be expected to substantially cancel each other, while in more dynamic image segments such pixel cancellation is less likely to occur.

In some implementations, the identification of the one or more static image segments, in action 483, may be performed by software code 140, executed by hardware processor 104 of system 100. Moreover, in some implementations, as noted above, system 100 may include ML model(s) 154 including an ML model trained to predict static image segments. In those implementations, hardware processor 104 may execute software code 140 to utilize that ML model included among ML model(s) 154 and trained to identify the one or more static image segments within the plurality of images in action 483, such as a transformer-based ML model trained to track individual pixels from image-to-image for example.

It is noted that utilization of a trained ML model for identification of static image segments in action 483 may be particularly advantageous or even necessary in use cases in which reference content 126/136 takes the form of a high dynamic range feature film, streaming content, or live content received from a live feed. In the case of streaming content or live content, for example, it may be impossible to avoid excessive latency in the provisioning of AR effects without the real-time identification of static image segments achievable using a trained ML model.

Continuing to refer to FIG. 4 in combination with FIGS. 1 and 3, flowchart 480 further includes evaluating the one or more static image segments identified in action 483 using at least one of a size criterion or a visual feature criterion (action 484). In order to be suitable for use as an anchor segment, in some use cases a static image segment may need to conform to size limitations. For example, an anchor segment should be large enough to be trackable by an AR application but small enough to avoid occlusion by subtitles or captioning. A size criterion applied to the one or more static image segments identified in action 483 may include a minimum and/or maximum pixel count for the cluster of pixels included in each static image segment. It is noted that such minimum and/or maximum pixel counts may have different values depending on what specific AR effects are to be inserted into an anchor segment. It is further noted that such minimum and maximum pixel counts provide lower and upper bounds for an anchor segment and are not themselves size targets per se. For example, depending on the anticipated distance of viewers from a display screen on which a quick-response (QR) code is to be rendered, the minimum pixel count may ensure adequate resolution of the QR code, while the maximum pixel count may prevent the QR code from obscuring other desirable imagery within the video frame or frames.

In addition to having an appropriate size, in order to serve as an anchor segment, the one or more static image segments identified in action 483 may also need to satisfy a visual criterion, such as by displaying at least at least a minimum contrast level, a minimum amount of visual texture, or both, which may be determined on a use case by use case basis. It is noted that visual texture refers to the spatial arrangement of light intensity within an image, and may be represented by a histogram of those intensities. The evaluation of the one or more static image segments identified in action 483 using at least one of a size criterion or a visual feature criterion, in action 484, may be performed by software code 140, executed by hardware processor 104 of system 100.

Referring to FIG. 4 in combination with FIGS. 1, 2 and 3, flowchart 480 further includes selecting, based on the evaluation performed in action 484, one of the one or more static image segments identified in action 483 as an anchor segment, such as one of anchor segments 262*a* or 262*b* (action 485). The selection of one of static image segments identified in action 483 as an anchor segment may depend on the intended use of the anchor segment as, well as any available information regarding the environment in which reference content 126/326 is to be consumed. By way of example, where reference content 126/326 is to be rendered on a large screen, or where the anchor segment is to be used for multiple or large AR effects, it may be advantageous or desirable to select a large anchor segment from among the one or more static image segments satisfying the evaluation criteria applied in action 484, while when captions or subtitles are to be rendered on the screen of a small closely held personal device, it may be preferable to select a small anchor segment from among the one or more static image segments satisfying the evaluation criteria applied in action 484.

It is noted that the anchor segment selected in action 485 is selected from among the one or more static image segments identified in action 483, and may be present in each of the plurality of images included in reference content 126/326. Selection of the anchor segment, in action 485, may be performed by software code 140, executed by hardware processor 104 of system 100, and in some implementations may include use, by software code 140, of another ML model included among ML model(s) 154. It is further noted that although action 485 of flowchart 480 describes selection of a single anchor segment, in some implementations hardware processor 104 may further execute software code 140 to select, based on the evaluation performed in action 484, another one of the one or more static image segments as another anchor segment. Moreover, in some use cases, those anchor segments may partially overlap.

Referring to FIG. 4 in combination with FIGS. 1 and 3, flowchart 480 further includes providing mapping data 128 identifying the location of the one or more selected anchor segments within each of the plurality of images included in reference content 126/326 (action 486). Mapping data 128 may include one or both of the frame number and timestamp of each of the plurality of images included in reference content 126/326. Moreover, in some implementations, the location identified by mapping data 128 may include in-image coordinates, such as pixel coordinates for example, of the selected one or more anchor segments. Mapping data be used to insert one or more of AR effects at the location or locations of the selected one or more anchor segments. Mapping data 128 may be provided, in action 486, by software code 140, executed by hardware processor 104 of system 100.

With respect to the methods outlined by flowchart 480, it is noted that actions 481, 482, 483, 484, 485 and 486 may be performed in a substantially automated process from which human involvement can be omitted.

Thus, the present application discloses systems and methods for detecting static image segments in a sequence of images, suitable for use as anchor segments. The present anchor segment detection solution advances the state-of-the-art by enabling the automated identification of static reference points within video content for example, without the need for visible markers or manual selection. The present anchor segment detection solution also has the potential to be more flexible and adaptable to different types of content, as it can analyze the changes in pixels over time to identify static image regions. Moreover, due to implementation of an ML model trained to predict static image segments, the anchor segment detection solution disclosed in the present application may advantageously be implemented as automated systems and methods that can be applied on large and/or visually complex image datasets, thereby allowing the processing of an extensive back catalogue of video or other content that would be impracticable to perform manually by a human, even with the assistance of a general purpose computer.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for overlaying one or more augmented reality (AR) effects on content, the system comprising:
   a hardware processor, and
   a system memory storing a software code;
   the hardware processor configured to execute the software code to:
   receive the content including a plurality of images in sequence;
   analyze the plurality of images to identify pixel feature changes between sequential images of the plurality of images;
   identify, based on the pixel feature changes, one or more static image segments within the plurality of images;
   evaluate the one or more static image segments using at least one of a size criterion or a visual feature criterion;
   select, based on evaluating, a first image segment of the one or more static image segments as an anchor segment;

provide mapping data identifying a location of the anchor segment within each of the plurality of images; and
   overlay, using the mapping data, the one or more AR effects at the location of the anchor segment within each of the plurality of images.

2. The system of claim 1, wherein the pixel feature changes between sequential images of the plurality of images are analyzed based on optical flow.

3. The system of claim 1, wherein the pixel feature changes between sequential images of the plurality of images are analyzed based on image subtraction between the sequential images.

4. The system of claim 1, further comprising a machine learning (ML) model trained to predict static image segments, wherein the hardware processor is further configured to execute the software code to:
   utilize the trained ML model to identify the one or more static image segments within the plurality of images.

5. The system of claim 1, wherein the visual feature criterion comprise at least one of texture or contrast.

6. The system of claim 1, wherein the one or more AR effects extend from a display screen into an environment in which the display screen displaying the anchor segment within each of the plurality of images is located.

7. The system of claim 1, wherein the hardware processor is further configured to execute the software code to:
   select, based on evaluating, a second image segment of the one or more static image segments as a second anchor segment,
   wherein the anchor segment and the second anchor segment partially overlap.

8. The system of claim 1, wherein the anchor segment includes a portion of each of the plurality images.

9. The system of claim 1, wherein the plurality of images comprise a plurality of video frames, and wherein the mapping data comprises at least one of frame numbers or timestamps.

10. The system of claim 1, wherein the location comprises in-image coordinates of the anchor segment.

11. A method for overlaying one or more augmented reality (AR) effects on content for use by a system including a hardware processor and a system memory storing a software code, the method comprising:
   receiving, by the software code executed by the hardware processor, the content including a plurality of images in sequence;
   analyzing, by the software code executed by the hardware processor, the plurality of images to identify pixel feature changes between sequential images of the plurality of images;
   identifying, by the software code executed by the hardware processor based on the pixel feature changes, one or more static image segments within the plurality of images;
   evaluating, by the software code executed by the hardware processor, the one or more static image segments using at least one of a size criterion or a visual feature criterion;
   selecting, by the software code executed by the hardware processor based on evaluating, one of the one or more static image segments as an anchor segment;
   providing, by the software code executed by the hardware processor, mapping data identifying a location of the anchor segment within each of the plurality of images; and overlaying, by the software code executed by the hardware processor using the mapping data, the one or more AR effects at the location of the anchor segment within each of the plurality of images.

12. The method of claim 11, wherein analyzing the pixel feature changes between sequential images of the plurality of images is based on optical flow.

13. The method of claim 11, wherein analyzing the pixel feature changes between sequential images of the plurality of images is based on image subtraction between the sequential images.

14. The method of claim 11, wherein the system further comprises a machine learning (ML) model trained to predict static image segments, the method further comprising:

utilizing, by the software code executed by the hardware processor, the trained ML model to identify the one or more static image segments within the plurality of images.

15. The method of claim 11, wherein the visual feature criterion comprise at least one of texture or contrast.

16. The method of claim 11, wherein the one or more AR effects extend from a display screen into an environment in which the display screen displaying the anchor segment within each of the plurality of images is located.

17. The method of claim 11, further comprising:

selecting, by the software code executed by the hardware processor based on evaluating, another one of the one or more static image segments as another anchor segment; and wherein at least two of the plurality of anchor segments at least partially overlap.

18. The method of claim 11, wherein the anchor segment includes a portion of each of the plurality images.

19. The method of claim 11, wherein the plurality of images comprise a plurality of video frames, and wherein the mapping data comprises at least one of frame numbers or timestamps.

20. The method of claim 11, wherein the location comprises in-image coordinates of the anchor segment.

\* \* \* \* \*